(12) United States Patent
Wah et al.

(10) Patent No.: US 6,355,298 B1
(45) Date of Patent: Mar. 12, 2002

(54) PLACEMENT SYSTEM APPARATUS AND METHOD

(75) Inventors: Cheng Chi Wah; Alfred Yue Ka On; Wong Chiu Fai, all of Kowloon (HK)

(73) Assignee: ASM Assembly Automation Ltd. (HK)

(*) Notice: Subject to any disclaimer, the term of this patent is extended or adjusted under 35 U.S.C. 154(b) by 0 days.

(21) Appl. No.: 09/379,309

(22) Filed: Aug. 23, 1999

(51) Int. Cl.[7] .................................................. B05D 1/36
(52) U.S. Cl. ............................ 427/8; 427/96; 427/265; 427/310; 228/102; 228/245; 228/246; 228/254
(58) Field of Search ................................ 118/669, 680, 118/323; 427/256, 421, 424, 8, 96, 310, 313, 265; 228/102, 245, 246, 254; 414/936, 935

(56) References Cited

U.S. PATENT DOCUMENTS

| | | | | |
|---|---|---|---|---|
| 5,467,913 A | * | 11/1995 | Namekawa et al. | ........ 228/246 |
| 5,816,481 A | * | 10/1998 | Economy et al. | ........... 228/207 |
| 6,013,899 A | * | 1/2000 | Eguchi et al. | ........... 228/180.1 |
| 6,070,783 A | * | 6/2000 | Nakazato | ..................... 228/246 |

* cited by examiner

Primary Examiner—Shrive P. Beck
Assistant Examiner—Kirsten A. Crockford
(74) Attorney, Agent, or Firm—Burns, Doane, Swecker & Mathis, LLP

(57) ABSTRACT

An apparatus and a method are disclosed for placing at least two elements on a surface. The apparatus comprises means for supplying a surface, means for transferring the two elements to the surface, means for adjusting the position of the surface in a first direction, and means for adjusting the position of the transferring means in a second direction and about a rotation axis parallel to a third direction, the first, second and third directions being mutually orthogonal. Recognizing means are provided on at least one of the transferring means for recognizing position alignment marks provided on the surface.

14 Claims, 4 Drawing Sheets

PLACEMENT SYSTEM APPARATUS AND METHOD

FIELD OF THE INVENTION

This invention relates to an apparatus and method for the placement elements on a surface, and in particular, but not exclusively to an apparatus and method for placing solder balls and flux droplets on a ball grid array (BGA) substrate in the mounting process of integrated circuit components.

BACKGROUND OF THE INVENTION

BGA techniques have become more common in recent years for connecting high-density IC components onto circuit boards. A regular array of fluxed solder balls is deposited on the circuit board at points where the leads of an IC component may be desired to be connected. An IC component may then be mounted on the board and connections are made between the leads of the component and the solder balls contacted by those leads.

To achieve this end, in a ball grid array technique droplets of flux and solder balls must be transferred to a substrate where they are deposited in a predetermined array. A common technique is to use a ball pick head. The ball pick head is used for transferring the solder balls to the substrate and is designed to carry the balls in the same array configuration as is required on the substrate and then subsequently to deposit the balls on the substrate. It is important, indeed essential, that all locations on the circuit board intended to be provided with a solder ball are so provided, since otherwise if a solder ball is missing a IC component lead may not be properly connected to the board and the entire circuit board may be useless. Conventionally the ball pick head is formed with a plurality of locations for receiving solder balls, these locations being disposed in the same array configuration as the desired configuration of solder balls on the circuit board. A corresponding flux head is used for depositing flux droplets on the array locations of the substrate.

While such techniques are generally effective, they present a number of challenges to the design of fast and efficient apparatus for the placement of solder balls and flux droplets in the context of a real-life production system. The apparatus must be designed so that the ball pick head and the flux head are brought in turn to a position over the substrate, and since the dimensions of the array and in particular the spacing between solder ball locations on the array is small, accurate alignment techniques must be employed. The need in a production process to transfer BGA substrates between locations, and to accurately align ball and flux pick heads over the substrate, presents challenges to the design of a fast and efficient apparatus.

SUMMARY OF THE INVENTION

According to the invention there is provided apparatus for placing at least two elements on a surface, comprising:
(a) means for supplying a said surface, said supplying means being adapted to move in a first direction,
(b) first transferring means for transferring a said first element to said surface,
(c) second transferring means for transferring a said second element to said surface,
(d) means provided on at least one of said transferring means for recognising and detecting the position of alignment marks on said surface,
(e) means for adjusting the position of said first and second transferring means relative to said surface in response to the position of said alignment marks, wherein said first and second transferring means are fixed together at a single position in said first direction and means are provided to move said first and second transferring means independently of each other in a second direction transverse to said first direction.

In a preferred embodiment of the invention said first and second transferring means are moved in said second direction to a position over said surface, and means are provided for moving said first and second transferring means in a third direction normal to the said surface. Preferably each said transferring means is provided with a respective recognising means, and means are provided to move each said recognising means with respect to each said transferring means in said first direction. Each said recognising means may comprise a camera assembly. Additionally, preferably means are provided for adjusting the position of the surface in the first direction Each said transferring means may be adapted to move in the second direction between a first position in which said transferring means receives an element to be placed, and a second position in which said transferring means is positioned above the surface. Each said transferring means may be adapted to transfer a plurality of elements, which elements may be disposed in a desired configuration. The apparatus is particularly suitable for transferring flux droplets and solder balls to a BGA substrate.

Viewed from another broad aspect the present invention provides apparatus for placing flux droplets and solder balls on a ball grid array substrate, comprising:
(a) means for supplying and supporting said substrate, said supplying means being adapted to move in a first direction,
(b) first transferring means for transferring flux droplets to said surface,
(c) second transferring means for transferring solder balls to said surface,
(d) means provided on at least one of said transferring means for recognising and detecting the position of alignment marks on said substrate,
(e) means for adjusting the position of said first and second transferring means relative to said substrate in response to the position of said alignment marks, wherein said first and second transferring means are fixed together at a single position in said first direction and means are provided to move said first and second transferring means independently of each other in a second direction transverse to said first direction, and
(f) means for adjusting the position of each said recognising means with respect to each said transferring means in said first direction.

Viewed from a still further broad aspect the present invention provides a method for placing at least two elements on a surface, comprising:
(a) supplying a said surface in a first direction to a receiving position,
(b) transferring a said first element to said surface by moving a first transferring means in a second direction transverse to said first direction to overly said surface,
(c) transferring a second element to said surface by moving a second transferring means in said second direction transverse to said first direction to overly said surface,
(d) recognising and detecting the position of alignment marks on said surface,
(e) adjusting the position of said first and second transferring means relative to said surface in response to the position of said alignment marks, (f) moving said first transferring means in a third direction normal to said surface, and (g) moving said second transferring means in said third direction normal to said surface.

Preferably the positions of the transferring means may be adjusted as required in the second direction and in a rotary direction about an axis parallel to said third direction. The position of the surface may be adjusted in the first direction.

Preferably step (d) is performed by recognising means provided on at least one of the transferring means.

For example, the recognising means may be provided on only one of the transferring means and step (d) may be performed by moving one of said transferring means in said second direction until said recognising means provided on said transferring means identifies a first alignment mark on the surface, moving said one said transferring means further in said second direction and moving said recognising means in said first direction relative to said transferring means until a second alignment mark is identified.

Alternatively recognising means may be provided on both of the transferring means and step (d) may be performed by prepositioning in the first direction the recognising means formed on said first transferring means and moving said first transferring means in the second direction until the recognising means of the first transferring means identifies a first alignment mark on the surface, and prepositioning in the first direction the recognising means formed on said second transferring means and moving said second transferring means in the second direction until the recognising means of the second transferring means identifies a second alignment mark on the surface.

This method is particularly suitable for placing solder balls and flux droplets on a BGA substrate.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
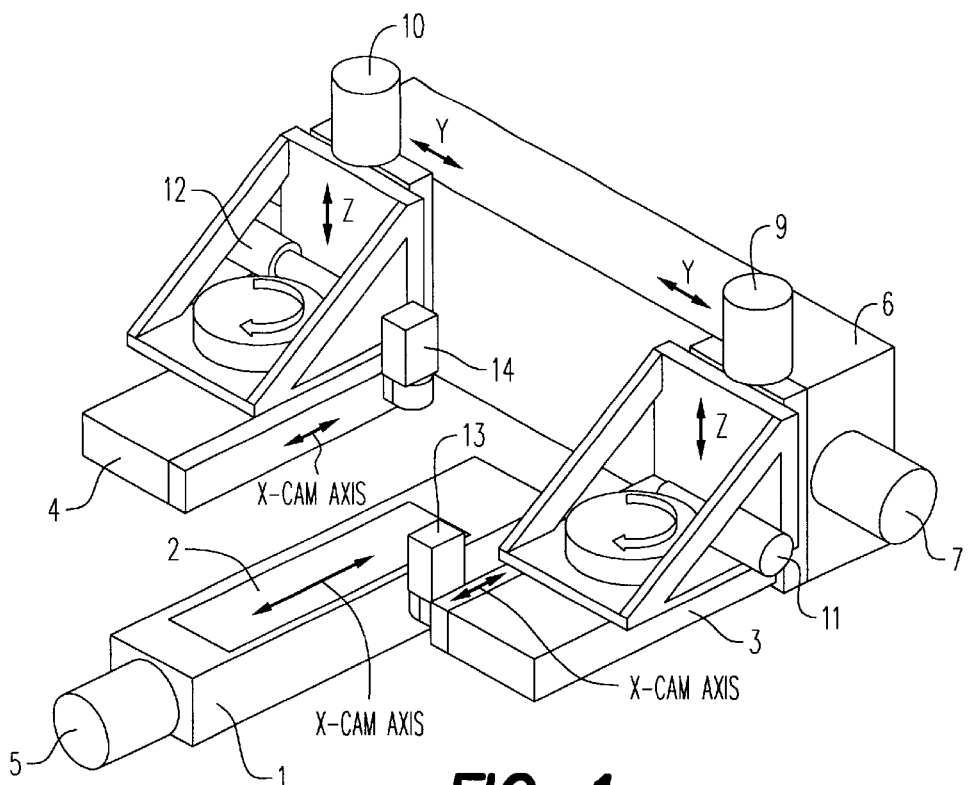
FIG. 1 is a perspective view of apparatus according to a first embodiment of the invention.

Referring firstly to FIG. 1 there is shown an apparatus according to a preferred embodiment of the invention. The apparatus comprises as major components a BGA substrate support 1 for holding thereon a BGA substrate 2, ball pick head 3 and flux pick head 4. Support 1 is adapted to be driven along an X axis by a motor 5 so that the BGA substrate 2 can be moved along the X-axis. The X axis corresponds to the long axis of the generally rectangular BGA substrate 2.

Figure 2:
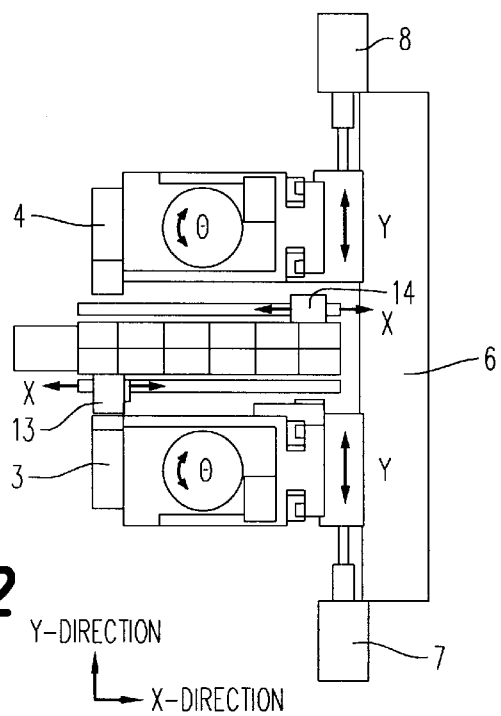
FIG. 2 is a plan view of the apparatus of FIG. 1.

Ball pick head 3 and flux pick head 4 are mounted on a common transverse member 6 which extends along a Y axis transverse to the X axis. The Y axis corresponds to the transverse short axis of the rectangular BGA substrate 2. The heads 3,4 are each adapted to move back and forth along the transverse member 6 in the direction of the Y axis by means of respective Y axis motors. Ball pick head Y axis motor 7 is shown in FIG. 1, the corresponding Y axis motor 8 for the flux pick head is shown in FIG. 2 but cannot be seen in FIG. 1.

Ball pick head 3 and flux pick head 4 are also both adapted to be moved in a Z direction by respective Z axis motors 9,10 such that the pick heads 3,4 can be raised and lowered with respect to the BGA substrate 2. Finally, both pick heads 3,4 are also adapted to be rotated about a theta axis by respective theta axis motors 11,12 which act to rotate the pick heads 3,4 through the theta axis as shown by the arrows in FIG. 1 through gearing (not shown). Ball pick head 3 and flux pick head 4 are also each provided with a respective camera 13,14 directed towards the BGA substrate 2. Cameras 13,14 are adapted to move along the X-axis with respect to their respective pick heads 3,4. Cameras 13,14 are used for alignment purposes as will be described below. The operation of the apparatus of the preferred embodiment of the invention will now be described.

Figure 3:
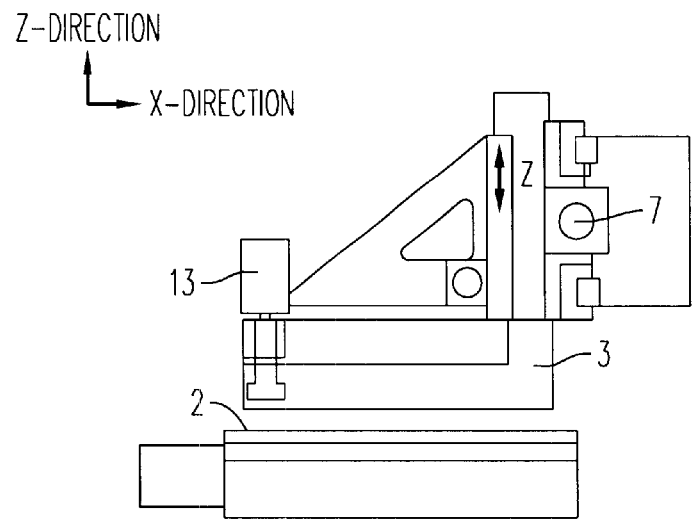
FIG. 3 is a side view of the apparatus of FIG. 1.

Before placement of the flux droplets and solder balls on the BGA substrate 2, cameras 13,14 are used in alignment technique to align the pick heads 3,4 over the substrate 2. One way of achieving this is shown in Figs.2 and 3. The BGA substrate 2 is provided with a pair of alignment marks 15 at diagonally opposed corners of the substrate 2. One of the pick heads 3,4 is moved into a position such that the respective camera on that pick head recognizes an alignment mark provided on the substrate 2. The camera then moves along the X axis and the pick head is moved along the Y axis until the camera recognizes the second alignment mark. Once the camera has recognized both alignment marks the position of the substrate can be calculated and the pick heads can be aligned with the substrate by making any necessary adjustments in the Y and theta axes.

An alternative alignment technique is for one of the pick heads 3,4 to move in the Y-direction and for its associated camera 13,14 to be pre-positioned in the X-direction such that the camera assembly 13,14 is able to recognise the corresponding alignment mark on the substrate. Simultaneously, or after the recognition of the first alignment mark, the other of the heads 3,4 is moved in the Y-direction with its associated camera 13,14 being pre-positioned in the X-direction to recognise the second alignment mark. In this way the alignment process is split between the two pick heads 3,4 each of which recognizes one of the two alignment marks. Based on the information from the two cameras 13,14 the position of the substrate with respect to the heads can be calculated. This alternative technique has the advantage that the travelling time and distance of the two camera assemblies 13,14 is reduced because they are prepositioned in the X-direction. This pre-positioning in the X-direction is possible because the location of the alignment marks on the same type of BGA substrate should be very close from one substrate to another.

Figure 4:
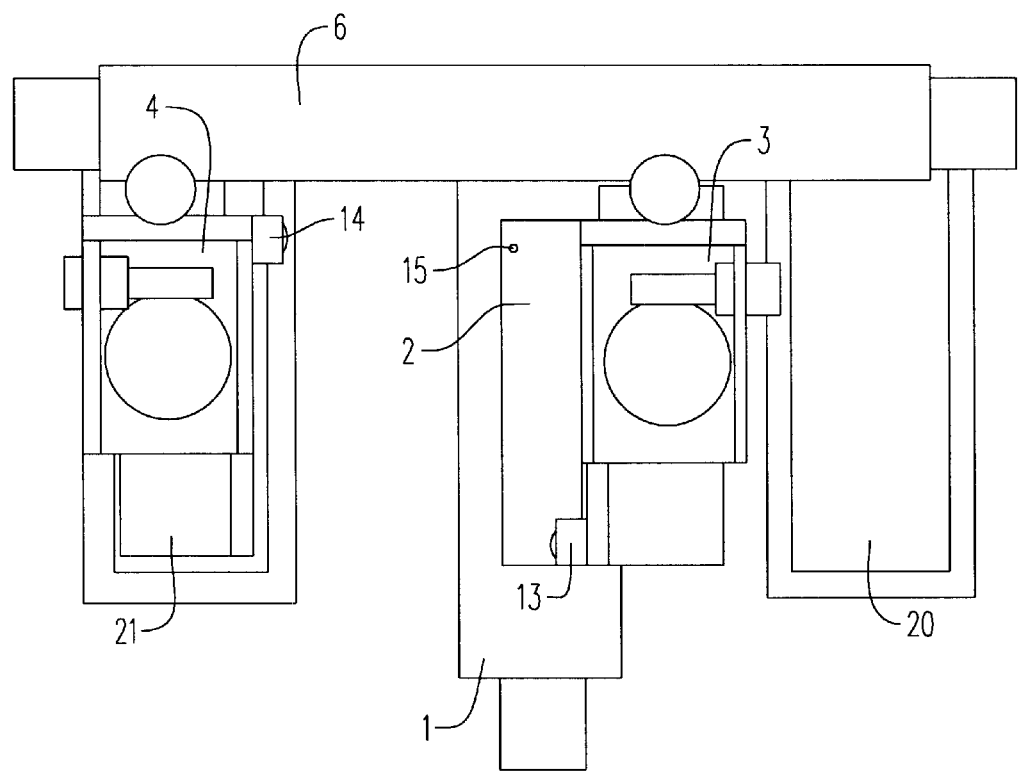
FIG. 4 is a plan view of the apparatus of FIG. 1 showing movement of the ball pick head.
Figure 5:
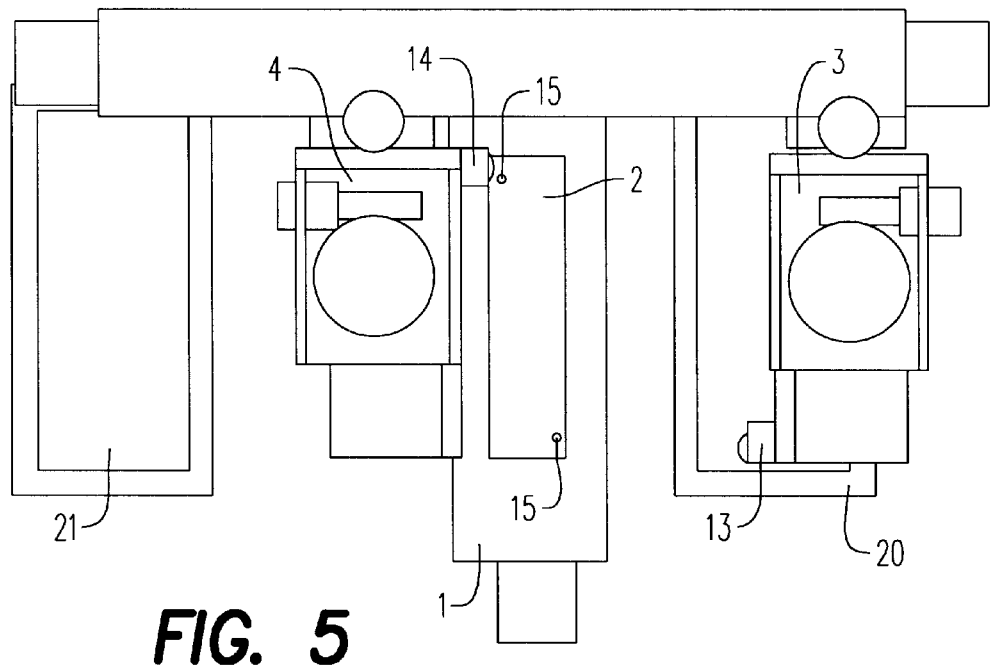
FIG. 5 is a plan view of the apparatus of FIG. 1 showing movement of the flux pick head.

The sequence of operation will now be described with reference to Figs.4 to 7. Referring firstly to FIG. 4, the ball pick head 3 moves to a position in the Y-direction such that its associated camera 13 is directly above the first alignment mark of the BGA substrate. Before this movement of the ball pick head 3 the camera 13 of the ball pick head 3 will have been prepositioned in the X-direction so that it is aligned in the X-direction with the first alignment mark. The camera assembly 13 will then recognize the first alignment mark and will supply position information of that alignment mark to a control apparatus (not shown).

The ball pick head 3 is then moved in the Y-direction away from the BGA substrate 2 to a ball supply unit 20 where the ball pick head 3 collects a supply of solder balls in any manner conventional in the art and which need not be described here.

Figure 6:
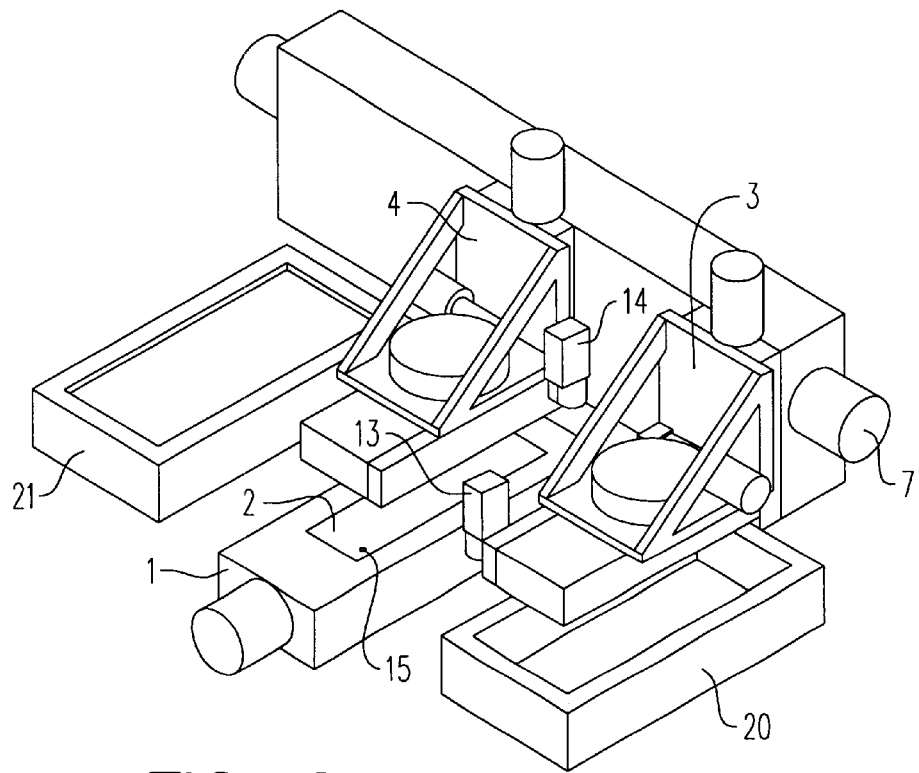
FIG. 6 is a perspective view of the apparatus of FIG. 1 showing the flux pick head located over the ball grid array substrate.

While the ball pick head 3 is collecting solder balls from the ball supply unit 20, the flux pick head 4 bearing flux droplets moves (FIG. 5) in the Y-direction to a position directly above the BGA substrate 2 such that the flux pick head camera 14 is located directly over the second alignment mark. Before this movement in the Y-direction the camera 14 has been prepositioned in the X-axis to correspond with the second alignment mark. Once the second alignment mark has been recognized this information is passed to the control apparatus and together with the information from the ball pick head camera 13 the position of the substrate may be determined and thus the flux pick head 4 position can be adjusted in the Y-direction and θ direction and the substrate support can be adjusted in the X-direction if necessary so that the flux pick head 4 is in proper alignment above the substrate 2 (FIG. 6). The flux pick head 4 is then lowered in the Z-direction to deposit flux droplets on the required positions on the BGA substrate.

Figure 7:
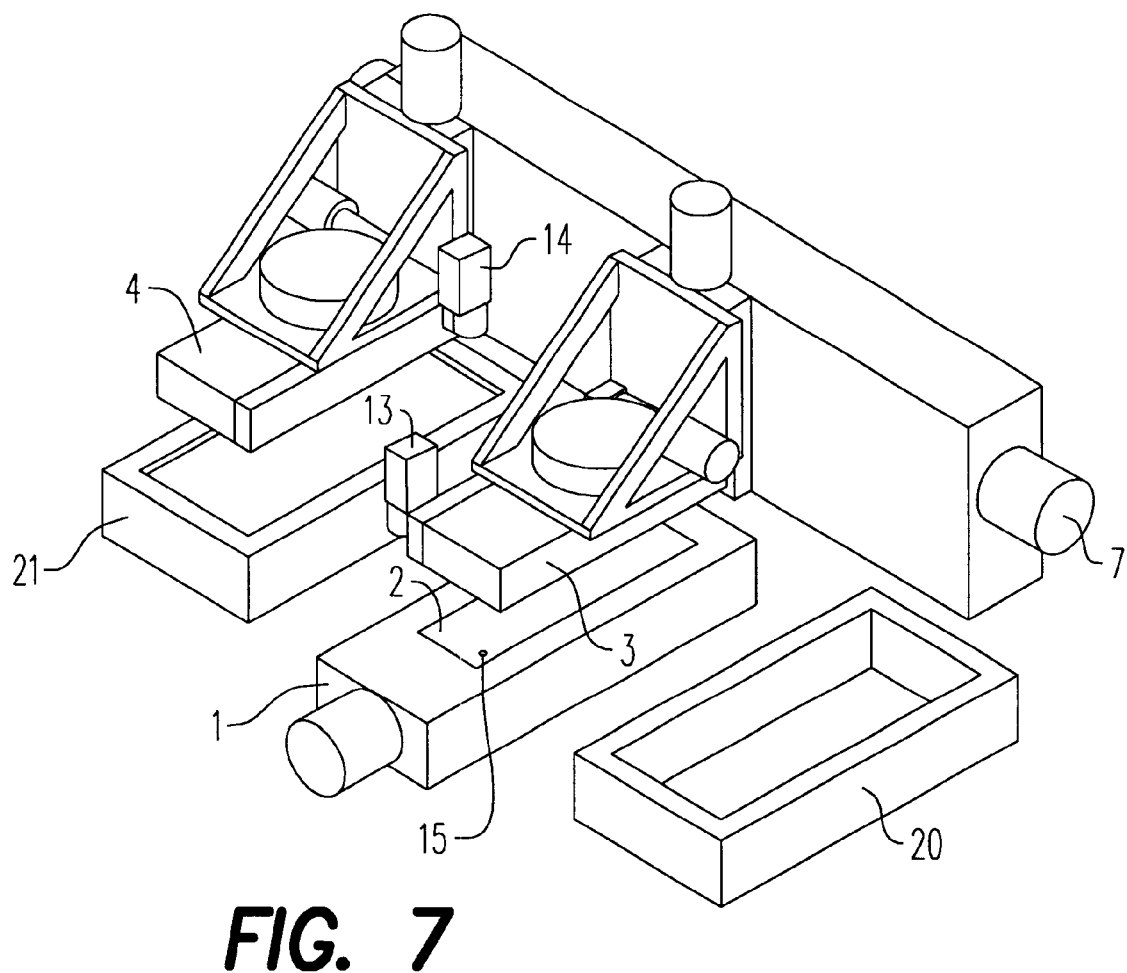
FIG. 7 is a perspective view similar to FIG. 6 but showing the ball pick head located over the ball grid array substrate.

Following deposition of flux droplets on the substrate 2, the flux pick head 4 is raised again and moved away from the substrate 2 in the Y-direction towards a flux station 21 where the flux pick head 3 receives further flux droplets in advance of the next cycle with a further BGA substrate. Meanwhile, as shown in FIG. 7, the ball pick head 3 moves in the Y-direction from the ball supply station 20 to a position aligned with the BGA substrate 2 using the alignment information previously obtained by the alignment of the ball pick head in the θ direction and the substrate support in the X-direction. The ball pick head 3 is then lowered in the Z-direction to deposit the solder balls on the BGA substrate 2.

The final stage in the process cycle is that the ball pick head 3 is then raised again in the Z-direction. However, the ball pick head 3 does not then immediately move away. Instead the substrate 2 is moved in the X-direction to a further station for the supply of components to be mounted in the substrate, and a new substrate 2 is moved in its place ready for the supply of solder balls and flux droplets. Since the ball pick head 3 is still in a position such that it is above the new substrate 2, the ball pick head may take the first alignment operation using camera 13 before it is moved away in the Y-direction to collect a supply of solder balls and the cycle starts again.

It will be seen that the present invention provides a number of advantages. Firstly, the flux and solder ball transfer processes can both be preformed while the substrate is located on a single support, so that the cost of having separate supports for the two operations can be avoided. Secondly, the overall process cycle can be shortened by performing only one alignment operation for both the flux and solder ball supply operations. Thirdly, because the camera assemblies are able to move in the X-direction when performing the alignment operation, the pick heads themselves do not need to move in the X-direction. Since the camera assemblies are much lighter than the pick heads, this simplifies the mechanism. Finally, because the substrate support is able to move in the X-direction when performing the positional adjustment using the alignment information obtained from the two cameras, the pick heads themselves do not need to be able to move in the X-direction to perform the position adjustment. As a result the mechanism of the pick heads is further simplified.

It should be noted that while the present invention is described above with reference to the placing of solder balls and flux droplets on a BGA substrate, the invention is not limited thereto and could applied to any situation where two sets of elements or object must be located accurately on a surface, eg a surface mount system for placing IC and other components on a BGA or other semiconductor package.

What is claimed is:

1. A method for placing two elements on a surface, comprising the steps of:
    positioning a first transferring device relative to said surface so that a first recognizing means disposed on said first transferring device detects a first alignment mark on said surface;
    positioning a second transferring device relative to said surface so that a second recognizing means disposed on said second transferring device detects a second alignment mark on said surface;
    aligning one of said transferring devices and said surface relative to one another in accordance with the positions of the first and second alignment marks as detected by said first and second recognizing means, respectively;
    placing one of said two elements on said surface by means of the aligned transferring device;
    aligning the other of said transferring devices and said surface relative to one another in accordance with the positions of the first and second alignment marks as detected by said first and second recognizing means, respectively; and
    placing the other of said two elements on said surface by means of the aligned other transferring device.

2. The method of claim 1 further including the step of moving said first transferring device to a location remote from said surface prior to positioning said second transferring device relative to said surface.

3. The method of claim 2 further including the step of retrieving an element to be placed on said surface with said first transferring device while it is at said remote location.

4. The method of claim 2 wherein the steps of aligning said one transferring device and placing said one element on said surface are carried out with the second transferring device while said first transferring device is at said remote location.

5. The method of claim 4 further including the step of retrieving said one element with said second transferring device while said first transferring device is positioned relative to said surface.

6. The method of claim 1 wherein said one element is a flux droplet and said other element is a solder ball.

7. The method of claim 6 wherein said first transferring device is a ball transfer head and said second transferring device is a flux transfer head.

8. The method of claim 1 wherein each of said first and second transferring devices moves along a first axis to position them relative to said surface and said recognizing means move along second axes transverse to said first axis, and further including the step of prepositioning said recognizing means along their respective second axes prior to positioning said first and second transferring devices relative to said surface.

9. A method for placing flux droplets and solder balls on a ball grid array substrate, comprising the steps of:
    positioning a ball pick head relative to said substrate so that a first recognizing means disposed on said ball pick head detects a first alignment mark on said substrate;

moving said ball pick head away from said substrate and retrieving a solder ball;

positioning a flux pick head relative to said substrate so that a second recognizing means disposed on said flux pick head detects a second alignment mark on said substrate;

aligning said flux pick head and said substrate relative to one another in accordance with the positions of the first and second alignment marks as detected by said first and second recognizing means, respectively;

placing a flux droplet on said substrate by means of the aligned flux pick head;

moving said flux pick head away from said substrate;

aligning said ball pick head and said substrate relative to one another in accordance with the positions of the first and second alignment marks as detected by said first and second recognizing means, respectively; and placing a solder ball on said substrate by means of the aligned ball pick head.

10. The method of claim 9 wherein each of said pick heads moves along a first axis to position them relative to said substrate and said recognizing means move along second axes transverse to said first axis, and further including the step of prepositioning said recognizing means along their respective second axes prior to positioning said pick heads relative to said substrate.

11. A method for cyclically placing at least two elements on each of a plurality of surfaces, wherein each cycle comprises the following steps:

moving a surface to a first position while a first transferring device is located at said first position;

detecting a first alignment mark on said surface with a first recognizing means disposed on said first transferring device;

moving said first transferring device to a second position;

moving a second transferring device from a third position to said first position;

detecting a second alignment mark on said surface with a second recognizing means disposed on said second transferring device;

aligning said second transferring device relative to said surface at said first position in accordance with positions of the first and second alignment marks as detected by said first and second recognizing means, respectively;

placing one of said two elements on said surface by means of the aligned second transferring device;

moving said second transferring device to said third position;

moving said first transferring device to said first position and aligning said first transferring device relative to said surface at said first position in accordance with positions of the first and second alignment marks as detected by said first and second recognizing means, respectively;

placing the other of said two elements on said surface by means of the aligned first transferring device; and moving said surface away from said first position.

12. The method of claim 11, wherein each cycle further includes the steps of retrieving said one element with said second transferring device while it is located at said third position, and retrieving said other element with said first transferring device while it is located at said second position.

13. The method of claim 11 wherein said one element is a flux droplet and said other element is a solder ball.

14. The method of claim 11 wherein each of said first and second transferring devices moves along a first axis to position them relative to said surface and said recognizing means move along second axes transverse to said first axis, and further including the step of prepositioning said recognizing means along their respective second axes prior to positioning said first and second transferring devices relative to said surface.

* * * * *